United States Patent
Glazov et al.

(10) Patent No.: US 6,764,672 B2
(45) Date of Patent: Jul. 20, 2004

(54) THERMALLY STABLE ALUMINA PARTICULATES

(75) Inventors: Michael V. Glazov, Pittsburgh, PA (US); John W. Novak, Jr., Baton Rouge, LA (US); Alexey Vertegel, Moscow (RU)

(73) Assignee: Alcoa Inc., Pittsburgh, PA (US)

( * ) Notice: Subject to any disclaimer, the term of this patent is extended or adjusted under 35 U.S.C. 154(b) by 12 days.

(21) Appl. No.: 09/825,473

(22) Filed: Apr. 3, 2001

(65) Prior Publication Data

US 2002/0192150 A1 Dec. 19, 2002

(51) Int. Cl.$^7$ .................................................. C01F 7/02
(52) U.S. Cl. ........................ 423/625; 423/628; 423/629
(58) Field of Search .............................. 502/303, 414, 502/415, 355, 439; 423/263, 111, 21.1, 625, 628, 629; 501/153

(56) References Cited

U.S. PATENT DOCUMENTS

| | | | |
|---|---|---|---|
| 3,433,581 A | 3/1969 | Stephens et al. | 23/2 |
| 3,545,917 A | 12/1970 | Stephens | 23/2 |
| 3,853,789 A * | 12/1974 | Warthen et al. | 252/463 |
| 3,867,312 A | 2/1975 | Stephens | 252/462 |
| 4,062,810 A | 12/1977 | Vogt et al. | 252/462 |
| 4,315,839 A * | 2/1982 | Bouge et al. | 252/448 |
| 4,508,849 A * | 4/1985 | Inoue et al. | 502/263 |
| 4,514,511 A * | 4/1985 | Jacques et al. | 502/8 |
| 4,624,940 A | 11/1986 | Wan et al. | 502/251 |
| 4,631,269 A | 12/1986 | Lachman et al. | 502/439 |
| 4,665,040 A * | 5/1987 | Kurita et al. | 501/105 |
| 4,677,095 A | 6/1987 | Wan et al. | 502/262 |
| 4,746,638 A * | 5/1988 | Hori et al. | 501/127 |
| 4,752,459 A * | 6/1988 | Pepper | 423/338 |
| 4,797,271 A * | 1/1989 | Fleming et al. | 423/625 |
| 4,868,150 A * | 9/1989 | Spooner et al. | 502/439 |
| 4,996,031 A | 2/1991 | Spooner et al. | 423/213.2 |
| 5,039,644 A | 8/1991 | Lachman et al. | 502/208 |
| 5,155,085 A | 10/1992 | Hamano et al. | 502/303 |
| 5,422,328 A * | 6/1995 | Ushikubo et al. | 502/312 |
| 5,573,582 A * | 11/1996 | Inui et al. | 106/287.17 |
| 5,593,654 A | 1/1997 | Decker, Jr. et al. | 423/625 |
| 5,718,879 A | 2/1998 | Chopin et al. | 423/628 |
| 5,879,645 A | 3/1999 | Park et al. | 423/213.2 |
| 5,911,960 A | 6/1999 | Miyoshi et al. | 423/213.5 |

FOREIGN PATENT DOCUMENTS

| | | | |
|---|---|---|---|
| GB | 1398893 | 6/1975 | F01N/3/15 |
| JP | 59196740 | 11/1984 | B01J/21/04 |
| JP | 63218254 | 9/1988 | B01J/37/02 |

* cited by examiner

Primary Examiner—Stanley S. Silverman
Assistant Examiner—Edward M. Johnson
(74) Attorney, Agent, or Firm—Julie W. Meder

(57) ABSTRACT

Thermally stable transitional alumina particulates retaining high specific surface area after calcination at 1000° C. suitable for the use as catalysts or catalysts supports are produced by treating an aqueous solution containing $Al^{3+}$ and optionally a doping amount of $La^{3+}$ (e.g., 0.3 mol. %) with an anion-exchange resin to give a stable hydroxide sol followed by freeze drying of the sol and further thermal dehydration. The resultant stabilized transitional alumina retains high specific surface area at 1000° C., and additionally stabilization is achieved at very low levels of added La.

13 Claims, 4 Drawing Sheets

THERMALLY STABLE ALUMINA PARTICULATES

BACKGROUND OF THE INVENTION

1. Field of the Invention

The present invention relates to alumina particulates, optionally stabilized by doping amounts of rare-earth elements, which retain a high specific surface area when exposed to elevated temperatures. More particularly, the invention relates to a process for preparing stabilized alumina.

2. Prior Art

Transitional aluminas, in particular the γ-modification, are extensively used as catalytic supports for automotive gas exhaust catalysts in internal combustion engines due to their high specific surface area. The activity of an alumina-supported catalyst depends on the specific surface area of the alumina. While supports of transitional aluminas, e.g. γ-$Al_2O_3$, may be used with catalysts to effectively reduce nitrogen oxides and oxidize the carbon monoxide and hydrocarbons contained in gas exhaust, these supported catalysts are unstable when exposed to elevated temperatures, e.g. greater than about 800° C. Such elevated temperatures frequently arise in exhaust systems for a significant period of time as a result of fuel detonation in an engine. At temperatures above about 800° C., γ-$Al_2O_3$ rapidly undergoes a phase transition from γ-$Al_2O_3$ to the thermodynamically stable alpha phase with concomitant drastic decrease in specific surface area and loss of catalytic properties. Additionally this phase transformation is accompanied by sintering, i.e. a particle agglomeration process.

One solution to this problem of thermally unstable transitional alumina is described in U.S. Pat. No. 3,867,312, incorporated herein by reference, which describes doping of transitional alumina with certain rare-earth oxides (particularly lanthania) to delay the undesirable phase transformation and prevent loss of surface area at elevated temperatures. Other dopants have also been used, including barium, cerium, other rare-earth elements, phosphorus, silicon compounds and others. Commercial doping of transitional alumina typically involves the use of $La_2O_3$.

Lanthanum doping can be performed by soaking $Al_2O_3$ powder in an aqueous solution of a lanthanide salt such as $La(NO_3)_3$, $La(CH_3COO)_3$ or $LaCl_3$. The lanthanide soaked alumina is subsequently dried at high temperature, e.g. about 600° C., followed by annealing. This method of lanthanum doping typically requires the use of about 3.0–3.5 mol % La to achieve a sufficient degree of stabilization. An industrial route involves the dissolution of pure metallic aluminum in hexanol, followed by hydrolysis and thermal treatments to obtain the desired alumina modification. Lanthanum compounds, which are typically used for stabilization, are expensive and add significantly to the cost of preparing stabilized alumina. Accordingly, a need remains for low cost stabilized alumina to reduce the cost of manufacturing catalytic converters.

SUMMARY OF THE INVENTION

This need is met by the method of the present invention of preparing thermally stable alumina which retains a high specific surface area after calcination at high temperature and which is suitable, among other applications, for supporting automotive gas exhaust catalysts. The method of the present invention includes steps of a) providing an aqueous solution of an aluminum salt, b) treating the aluminum solution with a hydroxyl group anion-exchanger to produce a composition comprising aluminum hydroxides at a preferred pH of about 6 to about 8, c) freeze-drying the aluminum hydroxide composition to produce an aluminum hydroxide powder and d) dehydrating the aluminum hydroxide powder to yield particulates of γ-alumina. The aluminum salt preferably is aluminum nitrate in a 1 molar solution. Dehydration may be achieved by heating the aluminum hydroxide powder to about 600° C. to about 800° C. followed by a cooling step.

The alumina produced according to the present invention may be further stabilized by including a salt of a lanthanide series element, preferably lanthanum in the form of $La(NO_3)_3$, in the aqueous solution. The molar ratio of aluminum to lanthanum in the aqueous solution preferably is about 0.0003 to about 0.03, more preferably about 0.001 to about 0.003. At the more preferred ratio, the final concentration of lanthanum in the γ-alumina is about 0.1 to about 0.3 mol %. Transitional alumina produced according to the present invention retains a specific surface area following annealing at about 1000° C. for about 3 hours of over 50 $m^2/g$ without lanthanum incorporated therein and up to at least 110 $m^2/g$ when lanthanum is included in the alumina particles.

BRIEF DESCRIPTION OF THE DRAWINGS

A complete understanding of the invention will be obtained from the accompanying drawing figures wherein like reference characters identify like parts throughout.

DESCRIPTION OF THE PREFERRED EMBODIMENTS

The present invention includes thermally stable alumina having a high specific surface area, which is retained when exposed to elevated temperatures (i.e. above about 800° C.), and methods of preparing the same. The stabilized alumina may contain a stabilizing amount of a dopant, preferably a lanthanide series element. The lanthanide series element preferably present in an oxide form, and more preferably is $La_2O_3$. The concentration of the lanthanide series element in the stabilized alumina expressed as moles of a lanthanum metal oxide relative to the stabilized alumina ranges from about 0.03 to about 3%, preferably from about 0.1 to about 0.3%. Stabilized alumina of the present invention when annealed at 1000° C. for 3 hours has a specific surface area, as measured by BET, preferably over 85 $m^2/g$, more preferably over about 100 $m^2/g$.

Figure 1:
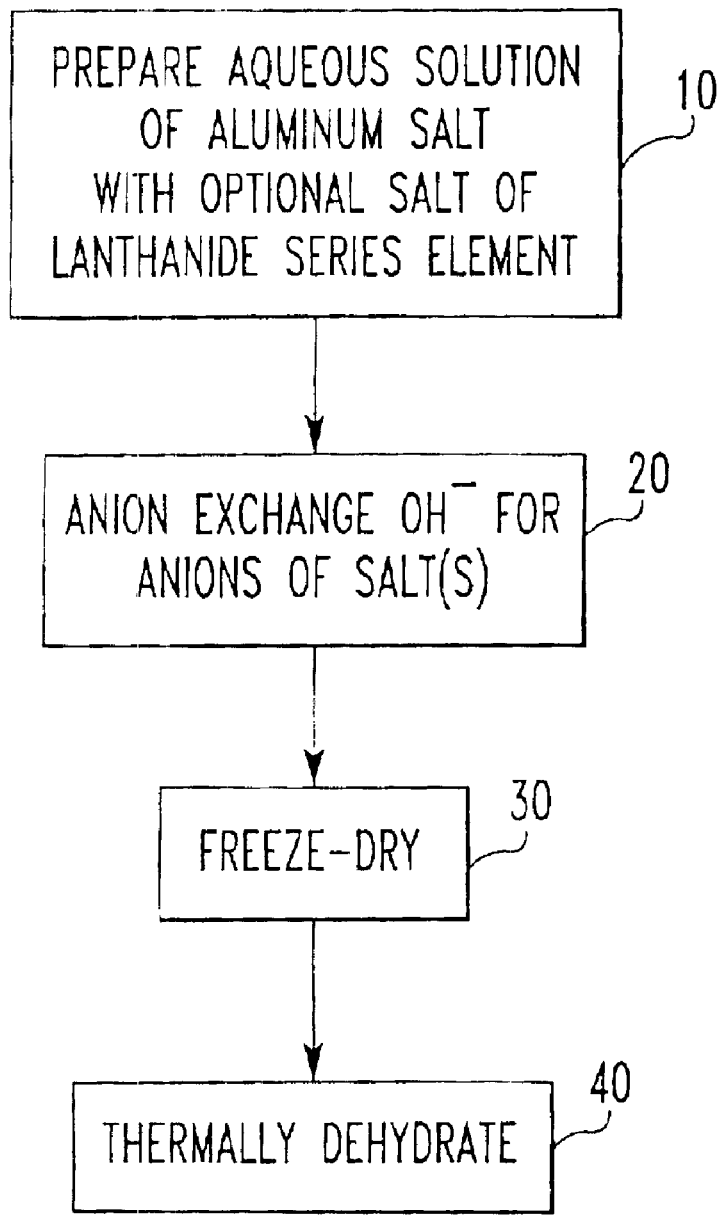
FIG. 1 is a flow chart of the steps of the method of the present invention.

As shown in the flow chart of FIG. 1, the present invention includes a method of preparing the stabilized transitional alumina of the present invention, either undoped or doped with lanthanum or another lanthanide series element. Hereinafter, the lanthanide series element is referred to as lanthanum, but this is only meant as one example of a suitable lanthanide series element.

In a first step 10, an aqueous solution of an aluminum salt is prepared. Suitable aluminum salts include $Al(NO_3)_2$, $Al(CH_3COO)_3$, and $Al(C_2O_4)_3$. The aqueous solution may contain a salt of a corresponding lanthanide series element, e.g. $La(NO_3)_3$, $La(CH_3COO)_3$, or $La_2(C_2O_4)_3$. Nitrates of aluminum and lanthanum are preferred, although the corresponding counter-anions need not be necessarily the same for the aluminum salt and the lanthanide series salt. The concentration of the lanthanum series salt is chosen so that the molar ratio of aluminum to lanthanum in the aqueous solution is about 0.0003 to about 0.03, preferably about 0.001 to about 0.003. At these relative levels, the resulting amount of a lanthanide series oxide in the final alumina, as expressed by molar percentage, is about 0.03 to about 3%, preferably about 0.1 to about 0.3%.

In step 20, the aqueous aluminum solution is subjected to a pH-controlled anion exchange treatment using a strong anion-exchanger in an $OH^-$ form. During anion exchange, the following process occurs:

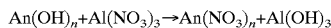

$$An(OH)_n + Al(NO_3)_3 \rightarrow An(NO_3)_n + Al(OH)_3$$

where $Al(OH)_3$ represents various forms of aluminum hydroxide present in the form of colloidal particles. Hydrolysis results in the formation of the $Al(H_2O)_6^{3+}$ cations, followed by several steps including condensation of primary particles followed by aggregation. The whole aggregation process can be represented as follows:

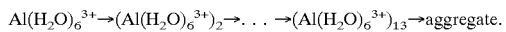

$$Al(H_2O)_6^{3+} \rightarrow (Al(H_2O)_6^{3+})_2 \rightarrow \ldots \rightarrow (Al(H_2O)_6^{3+})_{13} \rightarrow \text{aggregate.}$$

In the aggregation process, increasingly larger aggregates of hydrated alumina form, which eventually have "dead ends" which can no longer serve to aggregate the alumina. This process is not meant to be limiting as aggregates having over 13 alumina molecules may form or aggregates with less than 13 alumina molecules may form.

Contrary to conventional precipitation, anion exchange yields stable colloid solutions of aluminum hydroxides at concentrations of up to about 1.5 M substantially free of impurities. These colloidal systems are stable due to the decrease of ionic force of the solution during ion exchange.

Anion exchange preferably is carried out either by pouring the solution of aluminum salt (with or without a salt of a lanthanide series element) through a standard ion-exchange column, or by successive addition of small portions of a strong ion-exchange resin to the solution, stirring for 5–15 minutes, and removing the ion-exchanger by a conventional liquid/solid separation technique, for example, by filtration. In the case of preparation of doped stabilized alumina, anion exchange also enables homogeneous doping of aluminum hydroxide by a lanthanum series element in the colloidal solution. Spent anion-exchanger can be recycled, for example in the case of an $OH^-$ anion exchanger, by treatment with a concentrated hydroxide solution such as a KOH solution followed by washing with distilled water to a neutral pH of about 6 to about 8.

In step 30, the alumina colloidal aggregates are dried for use via freeze-drying. Freeze-drying avoids the elevated temperatures and resulting loss of specific surface area associated with conventional thermal drying of alumina. Preferably, freeze-drying of the sol of alumina colloidal aggregates is performed by rapidly cooling the sol of aggregates yielding amorphous hydrated aluminum oxides followed by a heating step to dehydrate the aluminum oxides.

Preferably, the hydrated oxide sol is quickly frozen using a conventional freezing agent such as liquid nitrogen. The final temperature of the frozen hydrated oxide sol is less than about −30° C., preferably less than about −50° C. The freezing is preferably performed by spraying the solution into a freezing agent. Other freezing techniques may be used including block freezing. The frozen hydrated oxides are placed into a vacuum chamber, which allows for temperature control thereof, and the pressure is decreased to a desired level. Pressures of about 3 to about 5 Pa are preferable. The temperature of the hydrated oxides is gradually increased to a temperature of at least about 50° C. for over about 6 hours, preferably for more than about 24 hours. The products of the freeze-drying are very friable powders of amorphous hydrated oxides having a density of about 0.03 to about 0.1 g/cm$^3$.

Transitional alumina (γ-alumina) is produced in step 40 by dehydrating the powders at a temperature of about 250 to about 800° C., preferably about 600 to about 800° C. for a sufficient period of time to remove adsorbed and chemically bonded water, for example, from about 2 to about 48 hours. The heating rate to the dehydration temperature preferably is less than about 5 degrees per minute, preferably about 1 degree per minute.

Although the invention has been described generally above, the particular examples give additional illustration of the product and process steps typical of the present invention.

EXAMPLES

Example 1

A 1 M solution of $Al(NO_3)_3$ (500 ml) was prepared from reagent grade $Al(NO_3)_3 \cdot 9H_2O$ and distilled water and was treated with small portions (about 3–5 grams each) of anion-exchanger Amberlite IRA-410 (Rohm & Haas Company). After each cycle of the treatment, the ion-exchange resin was separated out by filtering for regeneration and reuse. The anion exchange was carried out until the pH of the solution was about 6.0. No precipitation of $Al(OH)_3$ was observed. The resulting sol was sprayed into an aluminum tray containing a large excess of liquid nitrogen to achieve quick and uniform freezing. After evaporation of the excess of nitrogen, the cold tray was placed into a commercial freeze-dryer on a heating plate cooled to −50° C. and dried under vacuum of 3–5 Pa by increasing the temperature of the heating plate from −50° C. to 50° C for 24 hours. The resulting white friable powder was placed in a ceramic crucible and dehydrated at 500° C. for 3 hours.

Example 2

The procedure of Example 1 was repeated, except that the aqueous solution contained 1 M $Al(NO_3)_3$ and 0.001 M $La(NO_3)_3$ to obtain 0.1 mol. % (0.32 weight %) lanthanum oxide in the stabilized alumina final product.

Example 3

The procedure of Example 2 was repeated, except that the aqueous solution contained 1 M $Al(NO_3)_3$ and 0.003 M $La(NO_3)_3$ to obtain 0.3 mol % (1 weight %) lanthanum oxide in the stabilized alumina final product.

Figure 2:
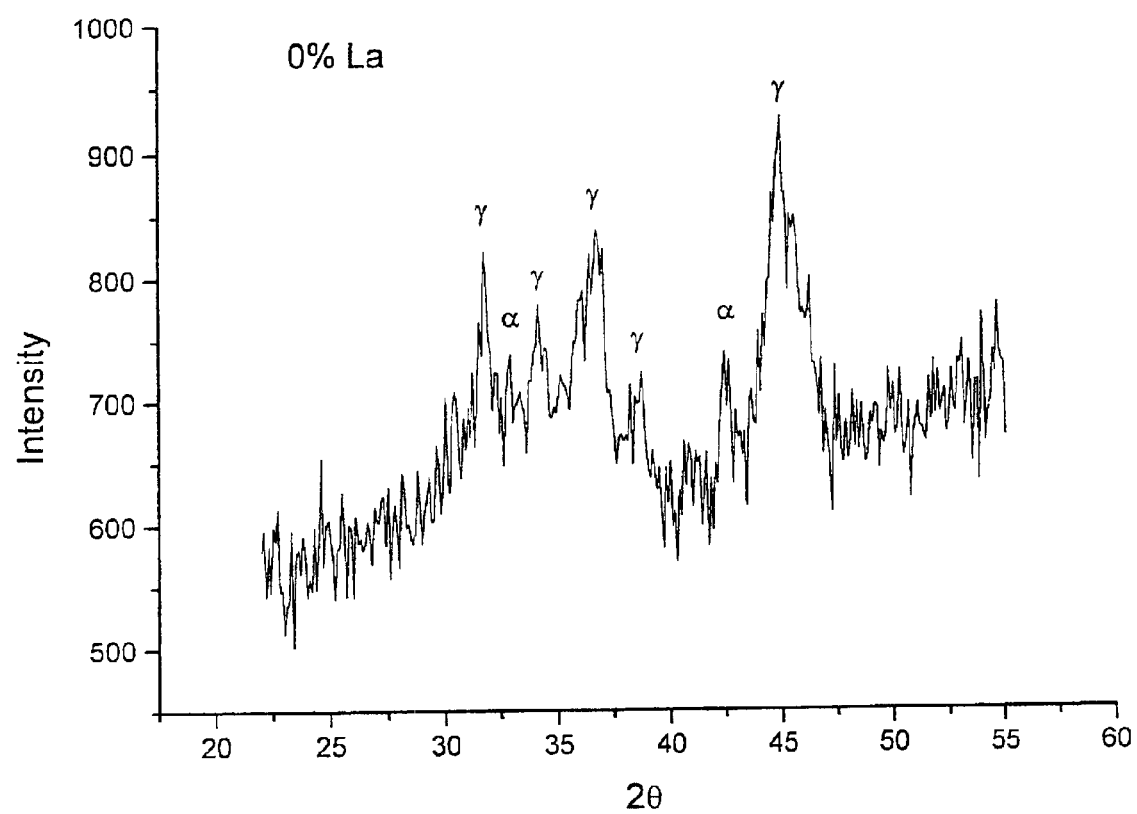
FIG. 2 is a graph of X-ray diffraction data for stabilized undoped alumina produced according to the present invention.
Figure 3:
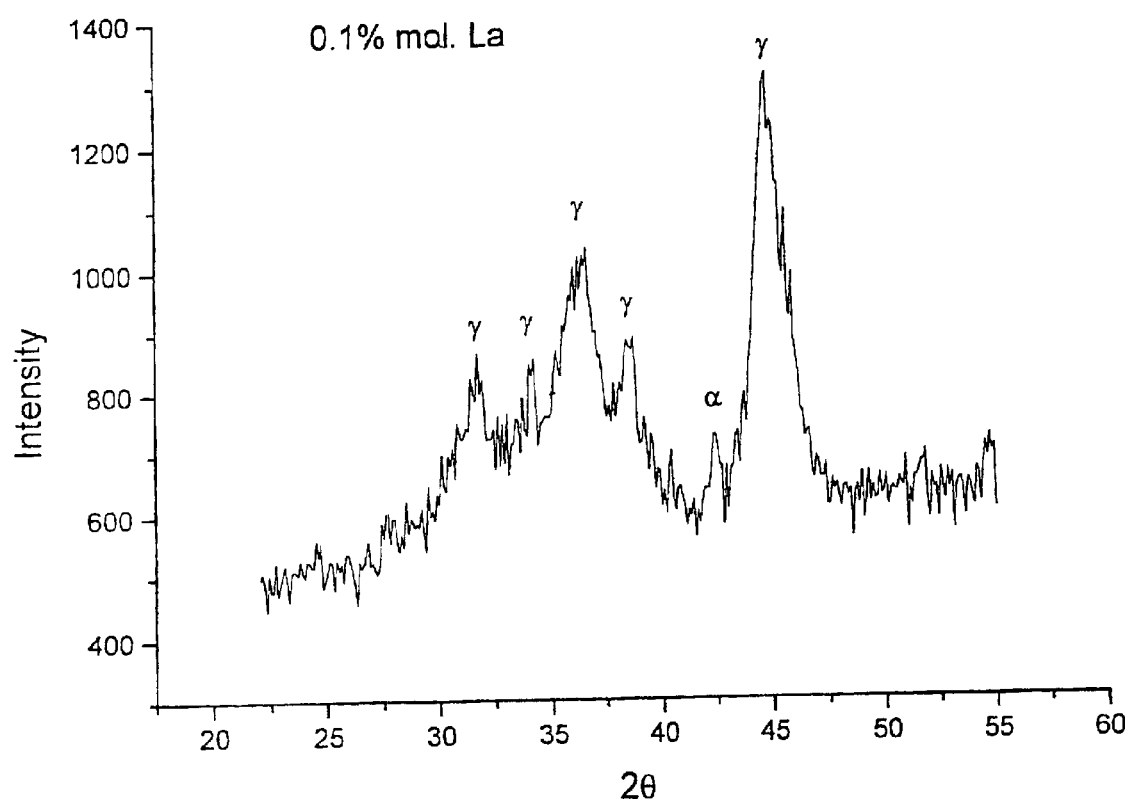
FIG. 3 is a graph of X-ray diffraction data for stabilized alumina doped with 0.1 mol % $La_2O_3$ produced according to the present invention.
Figure 4:
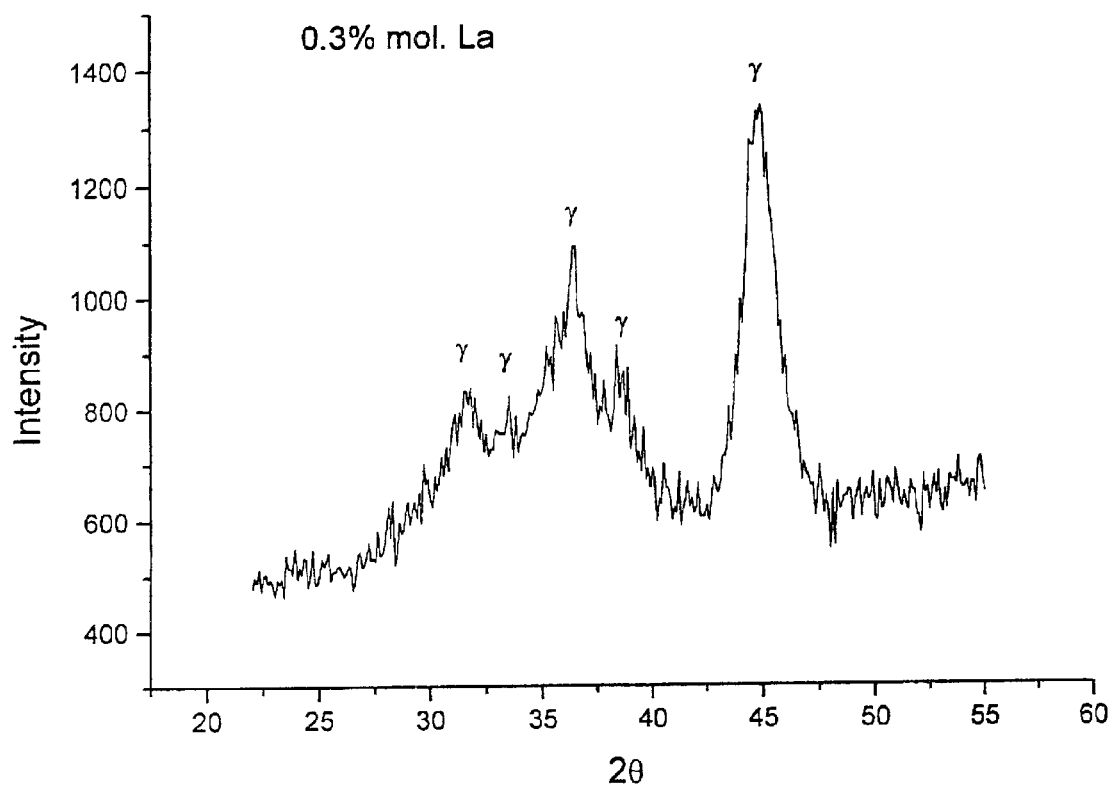
FIG. 4 is a graph of X-ray diffraction data for stabilized alumina doped with 0.3 mol % $La_2O_3$ produced according to the present invention.

The thermal stability of each of the powders produced in Examples 1–3 was tested by annealing the powders at 1000° C. for 3 hours at a heating rate of 1° C/min. For each example, the presence of γ-$Al_2O_3$ and α-$Al_2O_3$ (phase composition) was determined by x-ray diffraction (XRD) powder analysis, and the specific surface area was measured by BET as set forth in Table 1. The XRD data for Examples 1–3 appear in FIGS. 2–4.

TABLE 1

| Example | mol % La | Phase composition | Specific surface area (m$^2$/g) | Pore size distribution (nm) |
|---|---|---|---|---|
| 1 | 0 | γ-Al$_2$O$_3$ with some α-Al$_2$O$_3$ | 72.7 | 175,300 |
| 2 | 0.1 | γ-Al$_2$O$_3$ with traces of α-Al$_2$O$_3$ | 88.3 | 90 |
| 3 | 0.3 | γ-Al$_2$O$_3$ | 110 | >50 |

The data in Table 1 indicate that the method of the present invention produces stabilized γ-alumina, which retains high specific surface area after annealing at 1000° C. for 3 hours. The stabilization of γ-alumina is further improved and the pore size distribution is improved by doping with a lanthanide series element.

A benefit of the present invention is an approximate 10-fold decrease in the amount of a lanthanide series element necessary for successful stabilization of γ-alumina is achieved as compared to the previously described doping techniques.

It will be readily appreciated by those skilled in the art that modifications may be made to the invention without departing from the concepts disclosed in the foregoing description. Such modifications are to be considered as included within the following claims unless the claims, by their language, expressly state otherwise.

Accordingly, the particular embodiments described in detail herein are illustrative only and are not limiting to the scope of the invention which is to be given the full breadth of the appended claims and any and all equivalents thereof.

We claim:

1. A method of preparing thermally stable transitional alumina stabilized with additions of lanthanum comprising the steps of:
   a) providing an aqueous solution of an aluminum salt and a lanthanum salt;
   b) treating the solution with an inorganic hydroxyl group anion-exchanger to produce a composition comprising aluminum hydroxides and lanthanum hydroxides;
   c) freeze-drying the hydroxide composition to produce an aluminum hydroxide powder containing lanthanum; and
   d) dehydrating the aluminum hydroxide powder to yield particulates of γ-alumina stabilized with lanthanum.

2. The method of claim 1 wherein the salt of aluminum is aluminum nitrate.

3. The method of claim 2 wherein the aqueous solution comprises 1 M Al(NO$_3$)$_3$.

4. The method of claim 1 wherein the aluminum hydroxide composition has a pH of about 6 to about 8.

5. The method of claim 1 wherein said dehydrating step comprises (i) heating the aluminum hydroxide powder to a temperature of about 600° C. to about 800° C. to produce γ-alumina and (ii) cooling the γ-alumina.

6. A method of preparing thermally stable transitional alumina stabilized with additions of lanthanum comprising the steps of:
   a) providing an aqueous solution of an aluminum salt and a salt of a lanthanide series element;
   b) treating the solution of aluminum and lanthanide series element with an inorganic hydroxyl group anion-exchanger to produce a composition comprising aluminum hydroxides and hydroxides of the lanthanide series element;
   c) freeze-drying the hydroxide composition to produce a powder comprising the aluminum hydroxides and the hydroxides of the lanthanide series element; and
   d) dehydrating the powder to yield particulates of thermally stable γ-alumina containing the lanthanide series element.

7. The method of claim 6 wherein the aluminum salt comprises aluminum nitrate.

8. The method of claim 7 wherein the salt of a lanthanide series element comprises lanthanum nitrate.

9. The method of claim 8 wherein a molar ratio of aluminum to lanthanum in the aqueous solution is about 0.0003 to about 0.03.

10. The method of claim 9 wherein a molar ratio of aluminum to lanthanum in the aqueous solution is about 0.001 to about 0.003.

11. The method of claim 8 wherein the concentration of lanthanum oxide in the γ-alumina is about 0.1 to about 0.3 mol %.

12. The method of claim 6 wherein the aluminum hydroxide composition has a pH of about 6 to about 8.

13. The method of claim 6 wherein said dehydrating step comprises (i) heating the aluminum hydroxide powder to a temperature of about 600° C. to about 800° C. to produce γ-alumina and (ii) cooling the γ-alumina.

* * * * *